Figure 1:
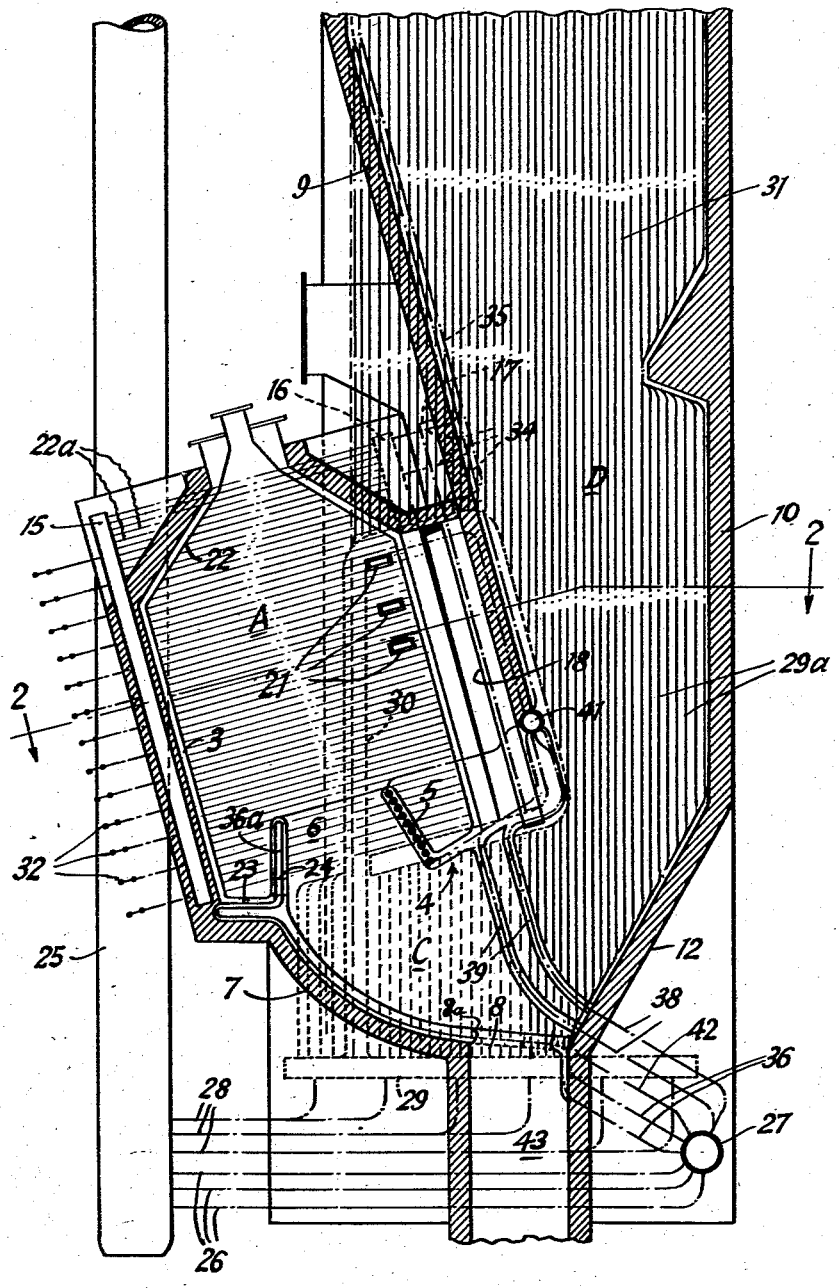

2,849,967
Patented Sept. 2, 1958

2,849,967

FLUID HEATER FURNACE

Johann Kölling, Oberhausen, Rhineland, Germany, assignor to The Babcock & Wilcox Company, New York, N. Y., a corporation of New Jersey Application August 24, 1953, Serial No. 375,918

3 Claims. (Cl. 110—28)

The present invention relates to a fluid heater furnace structure in which the combustion of fuel is effected in a primary furnace, or furnaces, suitably of the cyclone type. The apparatus is therefore especially adapted for burning ash-containing solid fuels in a relatively coarsely pulverized or granular form, with combustion being effected under conditions which result in furnace temperatures above the ash fusing temperature so as to permit the removal of residual ash as molten slag. As customarily constructed a cyclone-type furnace is of circular cross section and horizontally arranged, and comprises a combustion chamber through which the burning fuel and air are caused to move in a substantially helical path along the circumferential wall, the fuel to be burned being introduced in a high velocity stream of primary air carrying the solid fuel particles in suspension. The major portion of the combustion air is supplied as preheated secondary air through a tangentially arranged inlet extending lengthwise of the furnace chamber. The gases of combustion are discharged through a central outlet at one end, and the slag through a separate lower outlet, usually at the same end.

According to the present invention, each cyclone furnace is arranged in an upright position and formed about a central axis which is inclined to the vertical, suitably at an angle ranging from 15° to 45° depending on the particular installation involved. Each cyclone furnace is formed with walls which are defined by groups of tubes bent in semi-circular form, and arranged and connected for natural circulation of a cooling liquid therethrough. The combustion gases and slag are discharged through openings in the bottom end wall.

The inclination of the cyclone chamber axis by at least 15° from a vertical position results in an adequate upflow rate of liquid through the semicircular tubes. At the same time, it facilitates the drainage of slag, particularly if the bottom end wall is made conical toward the outside at such an angle that a generatrix of the conical bottom is horizontal, at which location the slag outlet is desirably formed in a radial plane.

The gases and slag from the cyclone furnaces are separately discharged into a succeeding chamber, herein termed a secondary chamber, wherein the entering hot gases are caused to flow adjacent a bottom opening through which molten slag is discharged from the chamber. The gases then flow upwardly into and through an additional chamber of which the walls are formed with tubes exposed to radiant heat of the chamber. Tubes associated with walls of the cyclone chambers are suitably combined with wall tubes of succeeding chambers to form a common circulatory system.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a specific embodiment of the invention is illustrated and described.

Figure 2:
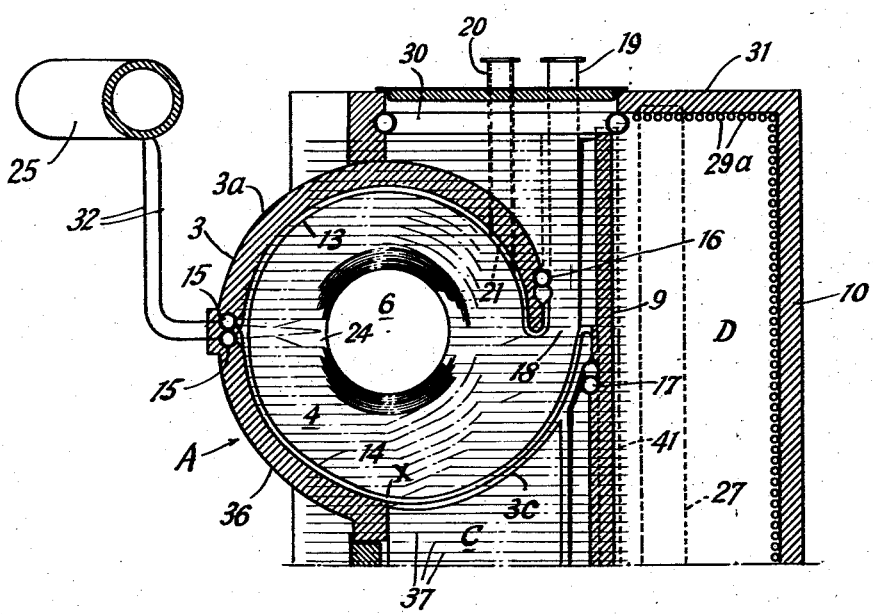

Of the drawings:

Fig. 1 is a vertical section of a fluid cooled furnace unit constructed in accordance with the invention; and Fig. 2 is a half-sectional view of the unit shown in Fig. 1, taken along line 2—2; the other half of the unit being of identical construction except for its reversed position.

The illustrative embodiment of the present invention thus comprises two cyclone furnaces, each of which is of generally circular cross section about a central axis which, as herein disclosed, is inclined downwardly toward an imaginary vertical line at an angle of approximately 15°. As illustrated, for one-half of the unit, a cyclone furnace A is formed with a cylindrical boundary wall 3 which defines an inner combustion chamber of generally circular cross section about a vertically inclined central axis. The bottom end wall 4 is formed with a reentrant wall section 5 of frusto-conical formation whereby there is provided a central gas outlet passage 6 of progressively increasing cross section toward the outside of the chamber. A second cyclone furnace B, not shown, is of identical construction except for the opposite-hand arrangement of parts relative to the vertical plane of symmetry. The gases from both furnaces are discharged into a lower secondary chamber C of which the front wall 7 curves downwardly and rearwardly to direct the discharging gases over the rim 8$a$ of a slag outlet 8 which is formed at the bottom. The gases then pass into a radiation chamber D through which the gases flow upwardly between front and rear upright walls 9 and 10. In the arrangement shown, the front wall 9 is inclined forwardly in an upward direction so as to extend parallel to a plane containing the central axes of cyclone furnaces A and B, whereas the rear wall 10 extends vertically, except for its lower end portion 12 which is steeply inclined toward the bottom slag outlet 8.

The walls of all such chambers are defined by tubes which are arranged and connected for natural circulation of liquid therethrough so as to constitute fluid heating components of a vapor generating unit, not completely shown. Accordingly, the circumferential wall 3 of cyclone furnace A, for example, is defined by two sets of cooling tubes 13 and 14 which are bent in generally semi-circular form and arranged at opposite sides of the furnace in successive transverse planes. The tubes 13 at one side, for wall portion 3$a$, extend through approximately one-half of the circumference from one of two inlet headers 15, 15 to a single outlet header 16, all of which headers are vertically inclined so as to parallel the cyclone furnace axis. In the remaining half-portion 3$b$ of the wall, tubes 14 extend between inlet and outlet headers 15 and 17, and are similarly bent in generally semi-circular form, at least to an intermediate location X, in the plane of the cyclone axes, and approximately halfway along the curvilinear extent of wall portion 3$b$. Beyond the location X, tubes 14 are bent in the form of an involute so as to define a continuing wall portion 3c of corresponding contour which terminates in radial spaced relation to the inner end portion of wall 13, thereby defining an axially elongated port 18 through which, from a nozzle 19, secondary air is discharged in tangential relation to the wall portion 3c. Other nozzles 20, for introducing the primary air-fuel mixture, are arranged parallel to nozzle 19, at the inner side thereof, with their respective discharge ports 21 at axially spaced locations.

Each cyclone furnace includes an upper conical end wall section 22 which is suitably defined by tubes 22a extending between headers 15 and 16 and headers 15 and 17. The bottom end wall 4, of conical formation, is dished at its inner side at such an angle that a generatrix of its upper surface is horizontal at its lowermost portion as shown in Fig. 1 at location 23. Furthermore, in a central plane of section, as seen in Fig. 1, the bottom wall 4 is suitably disposed at right angles to the frusto-conical gas outlet wall 5. The bottom wall 4 is formed with a slag outlet 24 which extends radially at the lowermost location 23 and continues through wall 5 into the central gas outlet 6.

A downcomer pipe 25, leading from an undisclosed upper drum of the unit, serves as a means for supplying liquid to wall tubes associated with at least that half of the unit containing furnace A. Boiler water, or other liquid, is supplied from pipe 25 to all furnace wall tubes; for example, for the one-half section illustrated, the distributing pipes or tubes 26 conduct water to a lower exterior drum 27 arranged adjacent the rear of the setting, while other pipes 28 conduct water to lower header 29 from which tubes 29a extend upwardly along a side wall 31 of radiation chamber D. As seen in Fig. 1, the side wall cooling tubes 29a are interrupted within the regions of nozzles 19 and 20 by a collector conduit 30, of quadrilateral form, which conducts the steam-and-water mixtures from tube lengths 29a below the collector, to similar tube lengths 29a above the collector. The pipe 25 is also connected through tubes 32 to the fluid inlet headers 15, 15 of the cyclone furnace. The fluid outlet headers 16 and 17 discharge through riser tubes 34 into cooling tubes 35 which extend along the front wall 9 of chamber D.

From the lower drum 27, certain tubes 36 extend upwardly along the curved bottom-and-front wall 7 of the secondary chamber C, and along its ceiling 37, continuing then as cooling tubes of the front wall 9 between the cooling tubes 35. Those tubes 36 which lie directly below the cyclone furnace A are bent outwardly and then inwardly in the form of loops, as indicated, to define the conical annular bottom 4 of the cyclone furnace. The inner group 36a, of tubes 36, when it reaches the gas outlet 6, is bent upwardly and then in a half-circle sidewardly so as to define the gas outlet nozzle 5. The tubes 36 then extend radially to the upright outlet header 17. Two tubes each are combined by forking so that they offer as little resistance as possible to the gas stream, and the outlet tubes of the two tube halves are arranged one behind the other in the direction of flow of the gases.

Tubes 38, forming a separate group, extend from the lower drum 27 to form a slag screen 39 between the chambers C and D, and then continue laterally and then upwardly to an intermediate, horizontally arranged header 41 to which the tubes 38 are connected, and from which other tubes extend parallel between tubes 35 to an upper drum, not shown. An additional group of tubes 42 extends along the upright rear wall 10 of radiation chamber D.

In the operation of cyclone furnace A, for example, the fuel to be burned is introduced through duct 20 in a high velocity stream of primary air carrying the solid fuel particles in suspension, the air-fuel mixture being discharged through nozzle ports 21 and thus entering the combustion chamber in a generally tangential direction. Secondary combustion air is introduced tangentially through the axially elongated port 18 which is disposed between the outlet headers 16 and 17. The gases of combustion are discharged through the central outlet passage 6, whereas molten slag drains through the bottom slag outlet 24 into the secondary chamber C from which it discharges through the bottom outlet 8 and thence through a vertical shaft 43 into a known form of slag disposal means, suitably sealed against the infiltration of air.

While in accordance with the provisions of the statutes I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of other features.

What is claimed is:

1. A fluid heating unit comprising wall means defining a vertically elongated furnace having an upper chamber with a lower chamber extending laterally therefrom, means defining a cyclone furnace of substantially circular cross-section arranged with its major axis at an acute angle to the vertical and having a restricted gas outlet in its bottom opening into said lower chamber, means for burning a slag-forming fuel in said cyclone furnace at a normal mean temperature above the fuel ash fusion temperature, and a molten slag outlet at the bottom of said cyclone furnace opening to said lower chamber, said lower chamber including an outwardly curved wall adjacent said cyclone furnace slag outlet extending downwardly from and forming a co-extensive continuation of a part of the perimeter of said gas outlet and having a rimmed slag outlet formed in the lower portion thereof for the free fall of slag from said lower chamber, said wall being arranged to receive molten slag discharging from the cyclone furnace slag outlet and so that gases from the cyclone furnace gas outlet will continuously sweep said wall and the lower chamber slag outlet before entering said upper chamber.

2. A fluid heating unit comprising wall means defining a vertically elongated furnace having an upper chamber with a lower chamber extending laterally therefrom, means defining a cyclone furnace of substantially circular cross-section arranged with its major axis at an acute angle of 15–45° to the vertical and having a restricted gas outlet in its bottom opening into said lower chamber, means for burning a slag forming fuel in said cyclone furnace at a normal mean temperature above the fuel ash fusion temperature, and a molten slag outlet at the bottom of said cyclone furnace opening to said lower chamber, said lower chamber including an outwardly curved floor adjacent said cyclone furnace slag outlet extending downwardly from and forming a co-extensive continuation of a part of the perimeter of said gas outlet and having a rimmed slag outlet formed in the lower portion thereof for the free fall of slag from said lower chamber, said floor being arranged to receive molten slag discharging from the cyclone furnace slag outlet and so that gases from the cyclone furnace gas outlet will continuously sweep the floor and the lower chamber slag outlet before entering said upper chamber.

3. A fluid heating unit comprising wall means defining a vertically elongated furnace having an upper chamber with a lower chamber extending laterally therefrom, means defining a cycline furnace of substantially circular cross-section arranged with its major axis at an acute angle to the vertical and having a restricted gas outlet in its bottom opening into said lower chamber, means for burning a slag forming fuel in said cyclone furnace at a normal mean temperature above the fuel ash fusion temperature, and a molten slag outlet at the bottom of said cyclone furnace opening to said lower chamber, said lower chamber including an outwardly curved floor adjacent said cyclone furnace slag outlet extending downwardly from and forming a co-extensive continuation of a part of the perimeter of said gas outlet and having a rimmed slag outlet formed in the lower portion thereof for the free fall of slag from said lower chamber, said floor being arranged to receive molten slag discharging from the cyclone furnace slag outlet and so that gases from the cyclone furnace gas outlet will continuously sweep the floor and the lower chamber slag outlet before entering said upper chamber, and an inclined fluid cooled screen extending between said upper and lower chambers in the path of the gas flow from said lower chamber.

References Cited in the file of this patent

UNITED STATES PATENTS

| 334,673 | Mitchell | Jan. 19, 1886 |
| 2,357,303 | Kerr et al. | Sept. 5, 1944 |
| 2,594,312 | Kerr et al. | Apr. 29, 1952 |

FOREIGN PATENTS

| 894,731 | France | Mar. 20, 1944 |